(12) United States Patent
Lowry et al.

(10) Patent No.: US 9,052,960 B2
(45) Date of Patent: Jun. 9, 2015

(54) TECHNIQUES FOR MAPPING AND MANAGING RESOURCES

(75) Inventors: Lee Edward Lowry, Orem, UT (US); Michael Joseph Sorensen, Santaquin, UT (US)

(73) Assignee: NetIQ Corporation, Provo, UT (US)

( * ) Notice: Subject to any disclaimer, the term of this patent is extended or adjusted under 35 U.S.C. 154(b) by 286 days.

(21) Appl. No.: 13/598,300

(22) Filed: Aug. 29, 2012

(65) Prior Publication Data

US 2014/0067985 A1 Mar. 6, 2014

(51) Int. Cl.
*G06F 9/50* (2006.01)
(52) U.S. Cl.
CPC .................................. *G06F 9/5061* (2013.01)
(58) Field of Classification Search
None
See application file for complete search history.

(56) References Cited

U.S. PATENT DOCUMENTS

| | | | |
|---|---|---|---|
| 6,587,959 B1* | 7/2003 | Sjolander et al. | 714/4.5 |
| 7,016,972 B2 | 3/2006 | Bertram et al. | |
| 7,177,267 B2* | 2/2007 | Oliver et al. | 370/216 |
| 7,315,259 B2 | 1/2008 | Sacks | |
| 7,673,031 B1 | 3/2010 | Jalagam et al. | |
| 8,683,226 B2* | 3/2014 | Popp et al. | 713/191 |
| 2001/0042139 A1 | 11/2001 | Jeffords et al. | |
| 2007/0022094 A1* | 1/2007 | Hicks et al. | 707/3 |
| 2007/0121626 A1* | 5/2007 | Shepard | 370/389 |
| 2008/0091746 A1* | 4/2008 | Hatasaki et al. | 707/204 |
| 2012/0311565 A1* | 12/2012 | Natapov et al. | 718/1 |
| 2013/0088335 A1* | 4/2013 | Babu et al. | 340/10.51 |

* cited by examiner

*Primary Examiner* — Brian P Whipple
(74) *Attorney, Agent, or Firm* — Schwegman Lundberg & Woessner, P.A.

(57) ABSTRACT

Techniques for mapping and managing resources are presented. Hardware capacity and information is collected over multiple processing environments for hardware resources. The information is mapped to logical business resources and resource pools. Capacity is rolled up and managed within logical groupings and the information gathering is managed via in-memory and on-file caching techniques.

6 Claims, 3 Drawing Sheets

TECHNIQUES FOR MAPPING AND MANAGING RESOURCES

BACKGROUND

Today, data centers are comprised of hardware that serves up memory, Central Processor Unit (CPU), storage, and other resources for applications to utilize. These resources are often pooled together and used for virtualized environments, where virtual machines (VMS) can be orchestrated to run workloads on any machine whenever needed. This has become a key foundation of cloud management, which allows capacity to be increased or decreased easily in the data center for customers that do not wish to manage the details of the hardware.

The challenge that exists is that business users do not want (or need) to know the details of the hardware in the data center, the operating system, or hypervisors being used, yet they still would like to know information about those assets as it relates to the business. For example, users often need to know how much capacity they have available or how many resources they have consumed. There needs to be an easy way to map system-specific capacity information that resides on various devices scattered throughout the data center into high-level business views that users can understand. This concept can apply to not only just capacity metrics, but also performance, health, and metering data, as well, in the enterprise.

In virtualized cloud environments within data centers, many companies are now employing a new technology called "Resource Pools." A resource pool allows one to aggregate all of the hardware resources of multiple dusters and/or standalone hosts into one logical view of hardware capacity that is available for client to use. This also allows administrators to more easily add, remove, and reorganize the allocation of resources.

SUMMARY

Various embodiments of the invention provide techniques for mapping and managing resources are provided. In an embodiment a method for mapping resources is presented.

Specifically, hardware information from hardware resources is collected over a network. Next, hardware identifiers for the hardware resources and the hardware information are organized. Finally, each hardware identifier is mapped with its hardware resource and its hardware information to a business resource.

DETAILED DESCRIPTION

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures.

Also, the techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Figure 1:
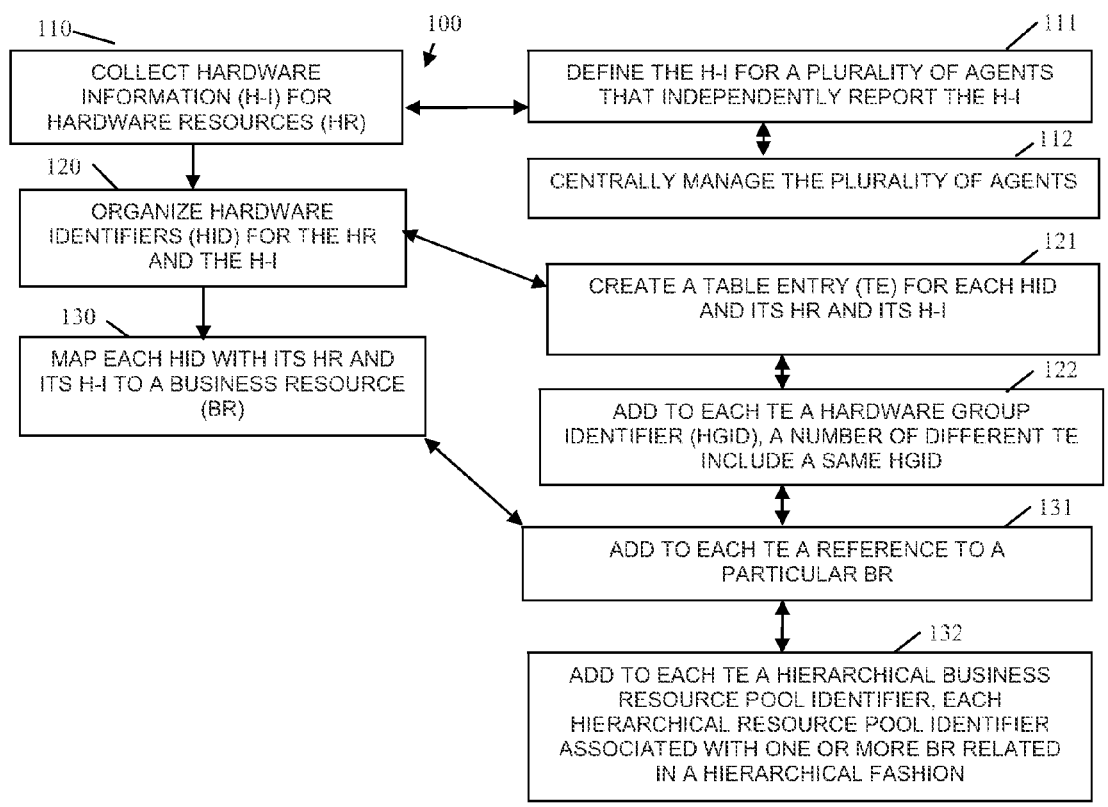
FIG. 1 is a diagram depicting a technique for mapping resources, according to an example embodiment presented herein.
Figure 2:
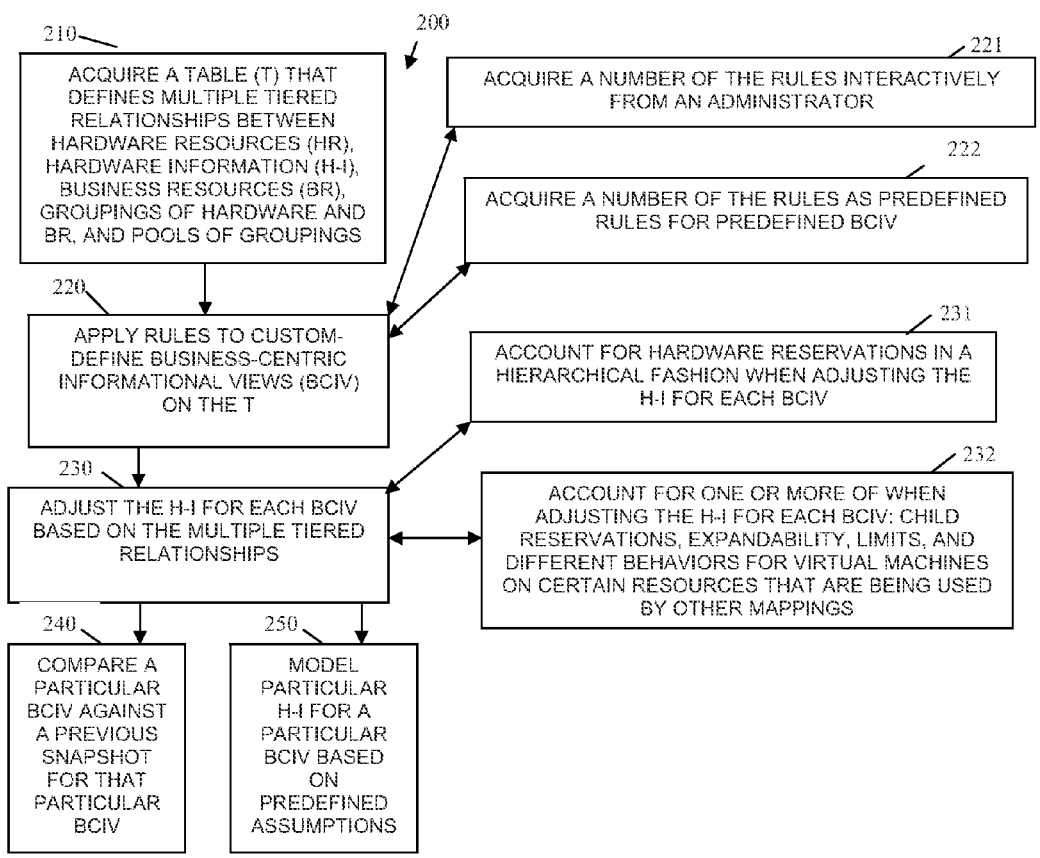
FIG. 2 is a diagram of a method for managing mapped resources, according to an example embodiment presented herein.
Figure 3:
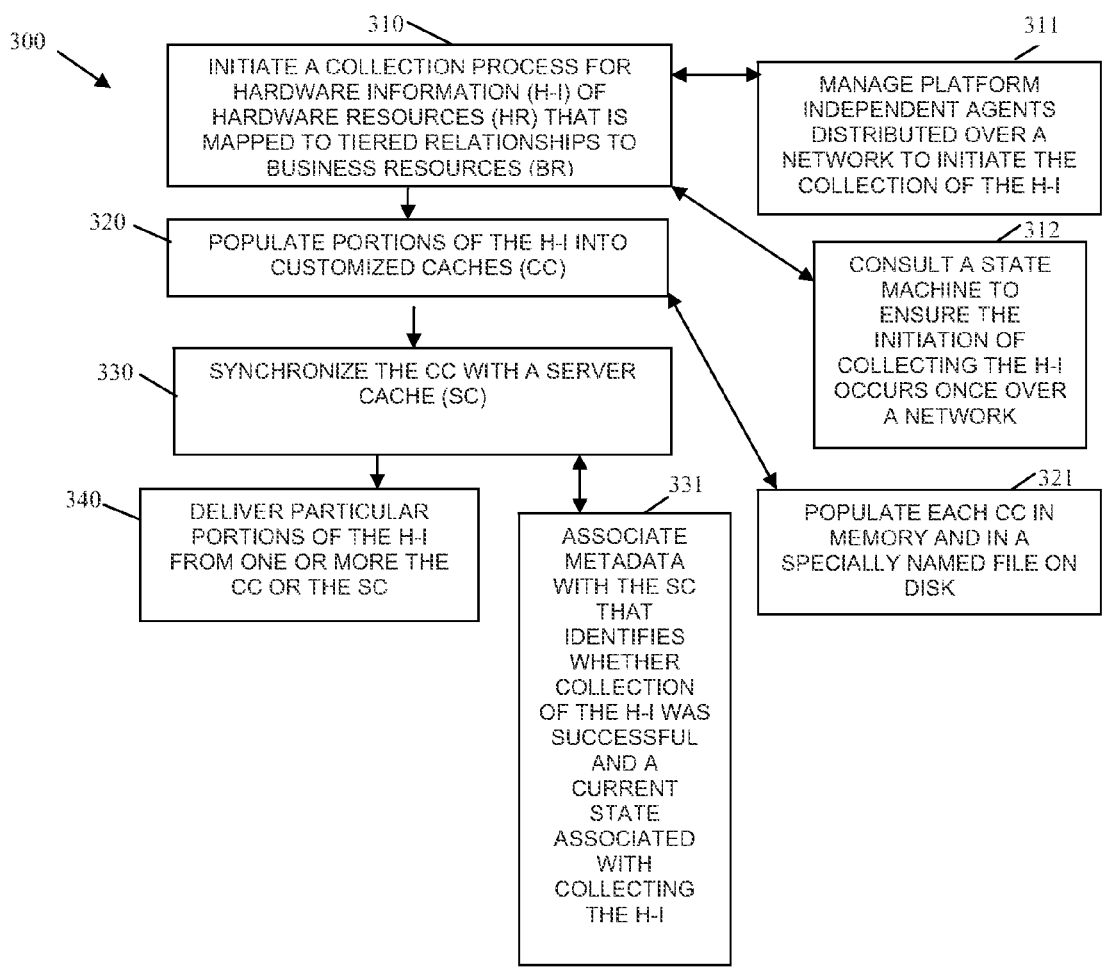
FIG. 3 is a diagram of another method for managing mapped resources, according to an example embodiment.

It is within this context that embodiments of the invention are now discussed within the context of the FIGS. 1-3.

FIG. 1 is a diagram depicting a method 100 for mapping resources, according to an example embodiment presented herein. The method 100 (herein referred to as "resource mapper") is implemented, programmed, and resides within a non-transitory machine-readable storage medium that executes on one or more processors of a network. The network may be wired, wireless, or a combination of wired and wireless.

The FIG. 1 presents the processing from the perspective of a server that coordinates and organizes information collected from a variety of different and disparate processing environments.

Some initial context with respect to what the resource mapper achieves is presented.

A central data collector mechanism is hardware and information agnostic. Hardware information is gathered up in a cross-platform and cross-hypervisor manner. The approach may be both a distributed, orchestration-based model, as well as a remote collector-node style of communication. The administrator can define sets of business-oriented data with agents that know how to collect this information and map to business-oriented fields in an abstract way. Each of these agents are versioned and managed centrally to provide a system to keep agents up to date or back-revision if necessary, which greatly relieves the administrator from having to administer this system manually.

Additionally, flexible relationship mapping information is pulled together into a table that maps each hardware asset to its capacity using a unique ID system for each hardware entity and all this is managed by the resource mapper (central data collector). A mapping process then binds this hardware information to logical concepts or groupings. Policies are defined to detect new hardware coming into the system so that it can be automatically assigned to logical business groupings and tracked. Policy-based rules can also be applied to the retiring of assets where "lifetimes" can be associated with each asset, so when assets expire they can be automatically disabled or physically removed out of the data center and the information mapping tables are automatically updated accordingly.

It is to be noted that the techniques presented herein can be equally beneficial as applied in a broader scenario, such as to an Identity System, for example, where information can be gathered up from various machines (or logical entities) and associated with an identity. So, rather than collect hardware information, the resource mapper collects identity information. These techniques, herein, can literally be expanded to any logical concept, whether it is identity, an application, or a business, etc.

It is within this initial context, that additional processing aspects of the resource mapper are presented with reference to the FIG. 1.

At 110, the resource mapper collects hardware information for hardware resources. The hardware information can include a variety of information, such as capacity information, current load information, resource versioning information, and the like. The hardware resources can also include a variety of devices such as, a physical machine, a virtual machine (VM), a physical processing environment as a whole, a virtual processing environment, and the like.

According to an embodiment, at 111, the resource mapper defines the hardware-information for a plurality of distributed network agents that each independently reports to the resource mapper its hardware information. It is noted that these agents can be hardware independent.

Continuing with the embodiment of 111 and at 112, the resource mapper centrally manages the plurality of agents.

At 120, the resource mapper organizes hardware identifiers for the hardware resources and the corresponding hardware information. So, each unique hardware resource receives a unique hardware identifier and is organized with its collected hardware information.

In an embodiment, at 121, the resource mapper creates a table entry for each hardware identifier and its hardware resource and its associated hardware information. That is the organized details of 120 are populated to a table or record entry.

Continuing with the embodiment of 121 and at 122, the resource mapper adds to each table entry (record) a hardware group identifier, and a number of different table entries (records) can include a same hardware group identifier. In other words, relationships between different hardware components can be defined and carried in the table records.

At 130, the resource mapper maps each hardware identifier with its hardware resource and its hardware information to a business resource. That is, relationships to logical business resources or even groupings of these business resources can be established and carried in each table record.

In an embodiment, at 131 and continuing with 122, the resource mapper adds to each table entry (record) a reference to a particular business resource.

Continuing with the embodiment of 131 and at 132, the resource mapper adds to each table entry a hierarchical business resource pool identifier. Each hierarchical resource pool identifier associated with one or more business resources that are related to one another in a hierarchical fashion.

So, it is apparent that the resource mapper collects, organizes, and maps hardware information to hardware resources and logical resources in multiple tiered relationships. This allows for a variety of beneficial processing discussed below with reference to the FIGS. 2 and 3.

FIG. 2 is a diagram of a method 200 for managing mapped resources, according to an example embodiment presented herein. The method 200 (herein after referred to as "resource manager") is implemented, programmed, and resides within a non-transitory machine-readable storage medium that executes on one or more processors of a network. The network may be wired, wireless, or a combination of wired and wireless.

The resource manager utilizes the mappings created by the resource mapper represented by the method 100 of the FIG. 1 above.

Again, some initial context is presented with respect to the resource manager.

The resource manager provides a tiered relationship mapping that maps the higher-level business views to the business view. For example, groups can be mapped to an organization. Any number of levels, mappings, and associations can be formed.

The resource manager also provides information roll-up capabilities that accommodate shared resources. So, once all the mappings are in place (such as via the resource mapper of the FIG. 1), the associations are followed and rules are applied to come up with business-centric informational views. The challenge in such an information-gathering system is to support the merging of data when there are shared resources in the system and to allow for mechanisms for data to be rolled up to higher levels in ways that ensure data accuracy, without double counting. An important element of rolling up information to higher organizational levels is the concept of alerts. Now, that the resource mapper and the resource manager provide such a mechanism for rolling-up information, also settings can be defined to alter processing if there is a problem anywhere in the organization.

The resource manager also provides data snapshots and filters for precision accuracy. So, further provisions are made to provide for more complex views of data that also allow for more potential accuracy of information that can be represented at the business-view level. One means by which this is done is by snapshotting information at initial load time for each hardware device in the data center and comparing that with information at any point in time later on.

The resource manager also provides support for future modeling of the data. Another means of allowing for more sophisticated views of data is to project what data would look like in the future—to project what future information or states will look like. If the hypervisor detects that the virtual machine has been defined but is not running, this means that all of its configuration settings can be processed by the Data Agent as "future reserved" settings. These reserved values are then added into the mathematical formulas to calculate hardware information impacts.

Again, it is noted that the relationship mapping can be done with any types of objects—not just organizations and groups.

Some other things that the resource manager achieves include: 1) Mapping business views to resource pools—so groups and organizations are mapped to resource pools. This mechanism lets resource groups be mapped to resource pools, which has access to an aggregate set of compute capacity. Groups can also be mapped to sub-resource pools, which have a subset of that compute capacity. This mechanism also allows for the traditional model to be mixed in where, for example a resource group can be mapped to a cluster, which may be an element used within a resource pool. 2) Roll up algorithm and capacity calculations—the challenge comes when one tries to figure out the capacity available to a given group and then to roll that up to a higher organizational level. The techniques herein account for the complexities of a hierarchical resource pool system. The key is that it does that while abstracting away the fact that one is even using hierarchical resource pools. The business viewer doesn't know. In other words, it mixes in the traditional view with the hierarchical resource-pool view in a consolidated view that merges the two models. 3) Handle hierarchical pool complexities—the challenge for mapping all of this information into a simple business view is greatly increased when one has to take into account the following unique characteristics of hierarchical resource pool architectures: 1) child reservations, 2) expandability, 3) limits, and 4) different behaviors of virtual machines on resources that are being simultaneously being used by resource pools and traditional group mappings. The basic algorithms that this mechanism takes into account deal with the following complexities by taking into account the following situations: a) reservations of child pool diminishes the capacity of the parent pool or ancestor pool; b) child pools can be set to expand beyond their reservation and take up the available capacity of a parent or ancestor pool; and c) limits of a child pool affect its potential capacity and how much of a parent pool it can possibly take.

Again, the resource manager can be generally applied to any architecture where one is trying to map any data center information to any type of resource-pool architecture.

It is within this context that the processing of the resource manager is now discussed with reference to the FIG. 2.

At 210, the resource manager acquires a table that defines multiple tiered relationships between hardware resources, hardware information, business resources, groupings of hardware and business resources, and pools of groupings. This table was and its contents were presented above in detail with reference to the resource mapper discussed within the context of the FIG. 1.

At 220, the resource manager applies rules to custom-define business centric informational views on the table. That is, the information as organized and defined in the table permits different business views onto that data to be provided on demand.

For example, at 221, the resource manager acquires a number of the rules interactively from an administrator. So, the administrator can interactively define rules for creating a specific business centric informational view from the table.

In another situation, at 222, the resource manager acquires a number of the rules as predefined rules for predefined business-centric informational views. So, the views can be predefined via predefined rules in some cases as well.

At 230, the resource manager adjusts the hardware information that is presented within each business-centric informational view based on the multiple tiered relationships.

According to an embodiment, at 231, the resource manager accounts for hardware reservations in a hierarchical fashion when adjusting the hardware information for each business-centric informational view.

In another case, at 232, the resource manager accounts for one or more of the following when adjusting the hardware information for each business-centric informational view: child reservations, expandability, omits, and different behaviors for virtual machines on certain resources that are being used by other mappings.

In an embodiment, at 240, the resource manager also compares a particular business-centric informational view against a previous snapshot for that particular business-centric informational view.

According to an embodiment, at 250, the resource manager also models particular hardware information for a particular business-centric informational view based on predefined assumptions.

It is now understood how data is organized in multiple tiered relationships to create views that provide a variety of details. The FIG. 3 now discusses how to optimize delivery and management for collecting and organizing that data.

FIG. 3 is a diagram of another method 300 for managing mapped resources, according to an example embodiment. The method 300 (herein after referred to as "information manager") is implemented, programmed, and resides within a non-transitory machine-readable storage medium that executes on one or more processors of a network. The network may be wired, wireless, or a combination of wired and wireless.

Before the information manager is discussed within the context of the FIG. 3 some initial context is presented.

That is, the information manager gathers up all hardware Information. The information gathering process is instrumented to run on a separate process that fires off periodically on its own. When it runs it authenticates as a system user that has access to see everything in the system. It then communicates abstractly with platform-independent agents, or through remote protocols. In a distributed environment, the challenge is that potentially thousands of clients could all be trying to view the same information, which could potentially cause this information-gathering process to be invoked thousands of times, which could cause performance to bottleneck. To manage this, a special state machine is set up to allow only one instance of this process to run at a time.

The information manager also provides information caching. That is, the techniques herein describe how cache files can stay decoupled from the underlying systems and support changes over time, which involves a special cache-file naming convention. It then describes the specific and unique structure of each of the cache files: 1) Item cache, 2) Resource cache, 3) Pool cache, and 4) Host cache.

So, the information manager provides intelligent client-server caches. The information manager provides a mechanism for client caches to be generically in sync with server caches in a distributed environment, as well as pick up additional important metadata about the state of the cache, while allowing even newer data to be picked up real-time while allowing for the optimal client-server exchange of information. When clients query the backend server to get system information a process launches and gathers up that information. Once that process has completed, it will store all of the results in the cache files; it also stores all of the results in an in-memory cache. This way, when this client, or any other client asks the backend for system information, that information will get served up immediately out of the cache. Additional cache meta data gets associated with this server cache, such as the cache ID (or timestamp); status information regarding the success or failure of the information gathering process (along with details); and the current state of the information gathering process (e.g. paused, stopped, running).

So, it is within this initial context that the processing of the information manager is now discussed with reference to the FIG. 3.

At 310, the information manager initiates a collection process for hardware information of hardware resources that is mapped to tiered relationships to business resources. This was described in detail with reference to the FIGS. 1 and 2 above. The information manager manages can initiates the processing associated with the FIG. 1. The information manager may also be viewed as an update process to the information provided in the FIG. 1.

According to an embodiment, at 311, the information manager manages platform independent agents that are distributed over a network to initiate the collection of the hardware information. Again, this can be done for initial population of hardware information or for update to existing hardware information.

In another case, at 312, the information manager consults a state machine to ensure the initiation of the collection of the hardware information occurs just once over the network.

At 320, the information manager populates portions of the hardware information into customized caches, such as the caches discussed above.

In an embodiment, at 321, the information manager populates each customized cache in memory and in a specially named file on disk.

At 330, the information manager synchronizes the customized cache with a server cache.

In an embodiment, at 331, the information manager associated metadata with the server cache that identifies whether the collection of the hardware information was successful and a current state associated with collecting the hardware information.

In another situation, at 340, the information manager delivers particular portions of the hardware information on demand to requesting clients from one or more of the customized caches and/or the server cache.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by a processor configured to perform the method, comprising:
    collecting, by the processor, hardware information from hardware resources over a network by using a remote protocol to interact with platform-independent agents that are distributed to processing environments to gather and report the hardware information;
    organizing, by the processor, hardware identifiers for the hardware resources and the hardware information; and
    mapping, by the processor, each hardware identifier with its hardware resource and its hardware information to a business resource.

2. The method of claim 1, wherein defining further includes centrally managing the plurality of platform-independent agents.

3. The method of claim 1, wherein organizing further includes creating a table entry for each hardware identifier and its hardware resource and its hardware information.

4. The method of claim 3, wherein creating further includes adding to each table entry a hardware group identifier, wherein a number of different table entries include a same hardware group identifier.

5. The method of claim 4, wherein mapping further includes adding to each table entry a reference to a particular business resource.

6. The method of claim 5, wherein adding further includes adding to each table entry a hierarchical business resource pool identifier, each hierarchical resource pool identifier associated with one or more business resources related in a hierarchical fashion.

* * * * *